(12) United States Patent
Kato et al.

(10) Patent No.: US 6,206,409 B1
(45) Date of Patent: Mar. 27, 2001

(54) AIR BAG SYSTEM

(75) Inventors: Hirokazu Kato, Ama-gun; Tadashi Ozaki, Gamagori; Minoru Fujioka, Anjo; Mutsumasa Koujiya, Toyota, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/139,761

(22) Filed: Aug. 25, 1998

(30) Foreign Application Priority Data

Aug. 26, 1997 (JP) .................................................. 9-246121

(51) Int. Cl.⁷ ............................. B60R 21/26; B60R 21/30
(52) U.S. Cl. ..................... 280/728.2; 280/743.1; 280/739
(58) Field of Search .......................... 280/728.2, 728.3, 280/730.1, 743.1, 739

(56) References Cited

U.S. PATENT DOCUMENTS

| | | | |
|---|---|---|---|
| 5,350,188 | * | 9/1994 | Sato ...................................... 280/739 |
| 5,498,023 | * | 3/1996 | Adams et al. ...................... 280/728.2 |
| 5,498,031 | * | 3/1996 | Kosugi ............................... 280/743.1 |
| 5,560,648 | * | 10/1996 | Rhule et al. ....................... 280/730.1 |
| 5,865,466 | * | 2/1999 | Yamamoto et al. ............... 280/743.1 |
| 5,899,495 | * | 5/1999 | Yamamto et al. ................ 280/743.1 |

FOREIGN PATENT DOCUMENTS

| | | |
|---|---|---|
| 3027291 | 5/1996 | (JP) . |
| 8-268198 | 10/1996 | (JP) . |

* cited by examiner

*Primary Examiner*—Lanna Mai
*Assistant Examiner*—Lynda Jasmin
(74) *Attorney, Agent, or Firm*—Pillsbury Madison & Sutro LLP

(57) ABSTRACT

An air bag system comprises an air bag having an opening through which gas is supplied. The air bag is folded in a predetermined polygonal shape and is then contained in a pad. An expansion restraining member is provided in the air bag system. The expansion restraining member temporarily holds a peripheral portion of the folded air bag so as to suppress rapid expansion thereof when the air bag is developed. Because the expansion of the peripheral portion is delayed by the expansion restraining member, it is possible to prevent the air bag from developing in the straight thin form toward a passenger. That is, the air bag can be developed in a round shape from its center portion when the gas is supplied into the air bag.

8 Claims, 14 Drawing Sheets

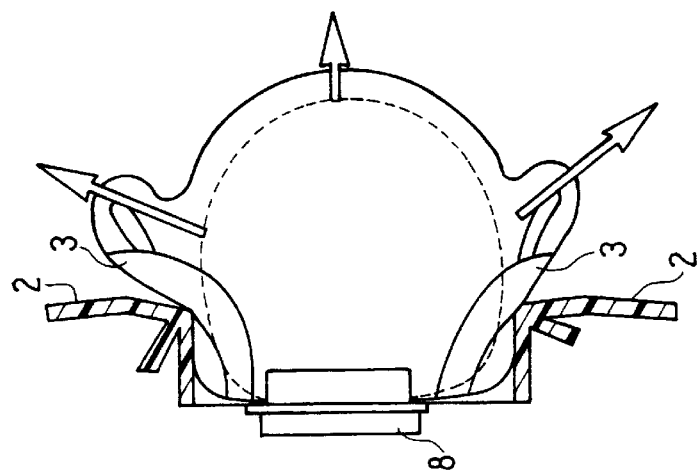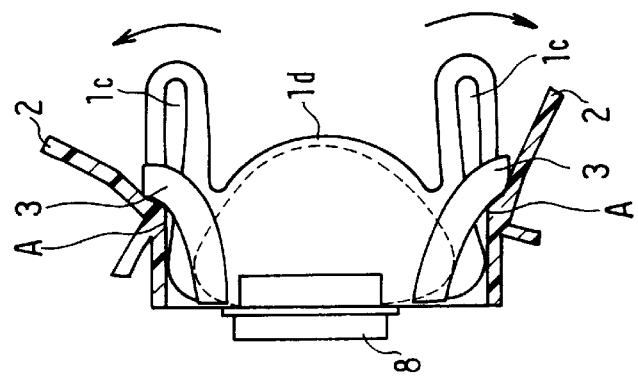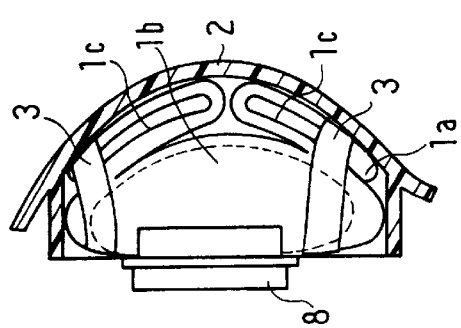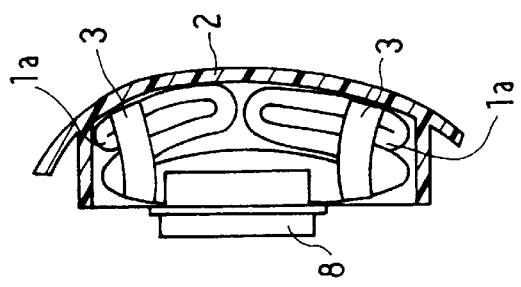

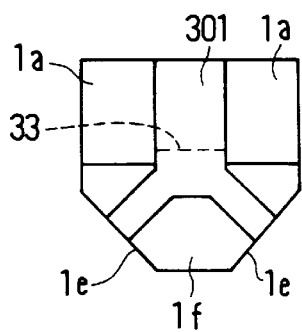
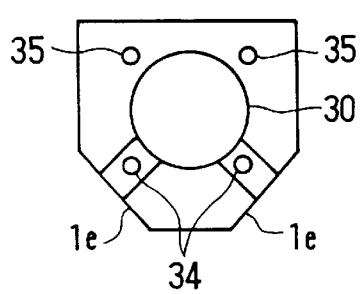
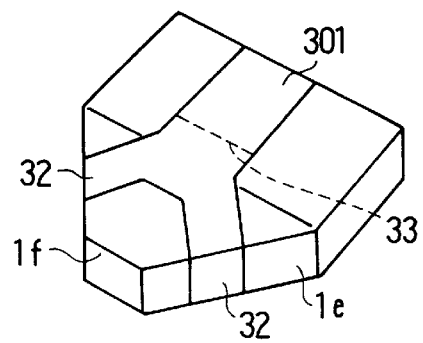
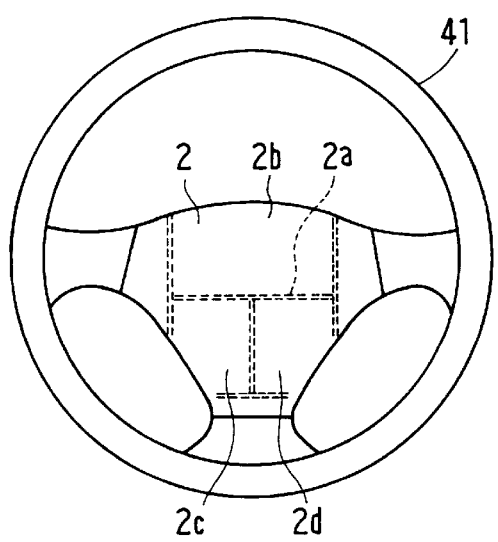
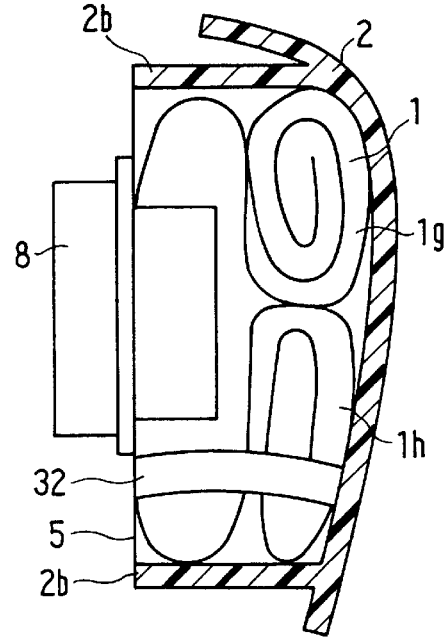

AIR BAG SYSTEM

CROSS REFERENCE TO RELATED APPLICATION

This application is based upon and claims priority from Japanese Patent Application No. H. 9-246121 filed on Aug. 26, 1997, the contents of which are incorporated herein by reference.

BACKGROUND OF THE INVENTION

1. Field of the Invention

The present invention relates to an air bag folded and contained in an air-bag system which is mounted on a vehicle and is used for passenger protection. In particular, the present invention relates to an air bag system which can develope the air bag not in a straight thin shape toward a passenger but in a round shape immediately after an inflator supplies gas into the air bag.

2. Description of the Related Art

Conventionally, an air bag system, as shown in FIG. 21, for protecting a passenger is known (Japanese Patent Application Laid-Open No. H.8-268198). In this air bag system 200, a base plate 21 made of metal is attached to a boss plate of a steering wheel (not shown) via a bracket or the like. An inflator attachment hole (not shown) is formed in the base plate 21. An inflator (not shown) is fit in the inflator attachment hole from a lower side of the base plate 21 in FIG. 21. On an upper side face of the base plate 21, a folded air bag 24 is attached. The folded air bag 24 is covered by a lapping sheet member 25, whereby the shape of the folded air bag 24 is maintained. A plurality of holes 25d is formed at each end of the lapping sheet member 25. The lapping sheet member 25 is fixed to the base plate 21 by inserting rivets into the holes 25d and holes formed in the base plate 21. A tear line 25c is formed at a substantially center part of the lapping sheet member 25.

Since the shape of the folded air bag 24 is maintained, when the folded air bag 24 is contained in a pad of the steering wheel, the pad of the steering wheel is prevented from expanding due to a restoring force of the folded air bag 24. Furhter, when the air bag 24 is developed, the lapping sheet member 25 is fractured at the tear line 25c due to pressure applied from the developing air bag 24.

However, according to the conventional air bag system as described above, a passenger may be strongly hit by the developing air bag 24. FIGS. 22A to 22D are schematic views illustrating a developing state of the air bag 24 contained in the pad 20 in a stepwise manner. The air bag 24 is first folded in a straight thin shape and then the both sides 24c of the straight thin shape are further folded plural times in perpendicular to a longitudinal direction of the straight thin shape. The air bag 24 thus folded is covered by the lapping sheet member 25 and is contained in the pad 20 (FIG. 22A).

When the inflator 80 is ignited and a gas produced by the inflator 80 flows into the air bag 24 upon detection of a vehicle collision, a part 24b of the air bag 24 in the vicinity of the inflator 80 expands due to pressure of the gas. As a result, the air bag 24 presses the pad 20 from the inside thereof (FIG. 22B). When the pressure applied from the air bag 24 to the pad 20 reaches a predetermined value, the pad 20 and the lapping sheet member 25 are fractured at tear lines 20a and 25c, respectively (FIG. 22C). As a result, a force for maintaining the shape of the folded air bag 24 is released at one time. For this reason, the air bag 24 is firstly developed in such a manner that side portions 24c of the air bag 24 folded in the straight thin shape rapidly project toward the passenger by energy of the gas stored in the part 24b of the air bag 24 (FIG. 22D), and then the air bag 24 is developed in a round shape.

As described above, according to the conventional air bag system, the side portions 24c of the air bag 24 vigorously project toward the passenger, that is, the air bag 24 is developed in a long thin shape toward the passenger. Such a developing form of the air bag 24 is not desirable because the developing air bag may injure the passenger.

SUMMARY OF THE INVENTION

Accordingly, it is an object of the present invention to provide an air bag system which can develop an air bag in an ideal shape.

In order to achieve the above-mentioned object, according to the present invention, an air bag system comprises an air bag having an opening through which gas is supplied. The air bag is folded in a predetermined polygonal shape and is then contained in a pad. Further, an expansion restraining member is provided in the air bag system. The expansion restraining member temporarily holds a peripheral portion such as a corner portion, side portion, tip portion or edge portion of the folded air bag so as to suppress rapid expansion thereof when the air bag is deployed. As a result, because the expansion of the peripheral portion of the folded air bag is delayed, it is possible to prevent the air bag from deploying in the straight thin form toward a passenger. That is, the air bag can be deployed in a round shape from its center portion when the gas is supplied into the air bag. Therefore, the air bag system according to the present invention can protect the passenger more reliably.

The expansion restraining member may be formed in a ring shape and may be fit to the corner portion of the folded air bag.

The expansion restraining member of a strap-like shape can temporarily hold the corner portion or the tip portion of the folded air bag by fixing both ends of the expansion restraining member to any one of the air bag itself, a retaining member for retaining the air bag, and a fixture such as a case used for attaching the air bag system to a vehicle.

When the expansion restraining member is disposed around the folded air bag while passing through a substantially center portion of the air bag, a tear line is preferably formed in the expansion restraining member. In this case, the expansion restraining member can maintain the shape of the folded air bag. Further, because the tear line is formed in the expansion restraining member, when pressure applied from the air bag to the expansion restraining member reaches a predetermined value, the expansion restraining member is reliably torn at the tear line. As a result, even if the expansion restraining member is disposed around the center portion of the air bag, the air bag is certainly deployed.

It is to be noted that, when the expansion restraining member is disposed around the center portion of the air bag, the torn expansion restraining member temporarily holds the corner portion or the tip portion of the air bag.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 2A–2D are schematic views illustrating a deploying state of the air bag according to the first embodiment in a stepwise manner;

FIGS. 7A and 7B are views illustrating a state that the folded air bag is temporarily held by the expansion restraining member in the second embodiment;

FIG. 8 is a perspective view illustrating a state that the folded air bag is temporarily held by the expansion restraining member in the second embodiment;

FIG. 9A a schematic view of a steering wheel and a pad thereof according to the second embodiment;

FIG. 9B is a schematic view illustrating a state that the folded air bag is contained in the pad in the second embodiment;

DETAILED DESCRIPTION OF THE PREFERRED EMBODIMENTS

Embodiments of the present invention will now be explained with reference to the drawings.

(First Embodiment)

Figure 1:
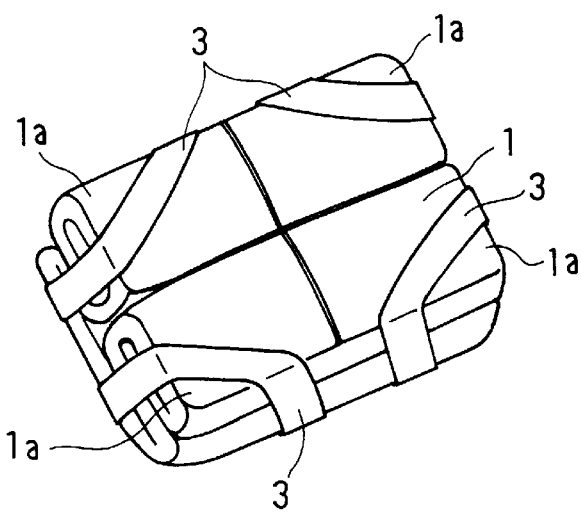
FIG. 1 is a perspective view schematically illustrating a state that an air bag is temporarily held by an expansion restraining member in a first embodiment of the present invention.

In FIG. 1, an air bag 1 is folded in a predetermined shape (rectangular shape). Each of the corner portions 1a of the air bag 1 is held by an expansion restraining member 3 of a ring shape.

Figure 3A:
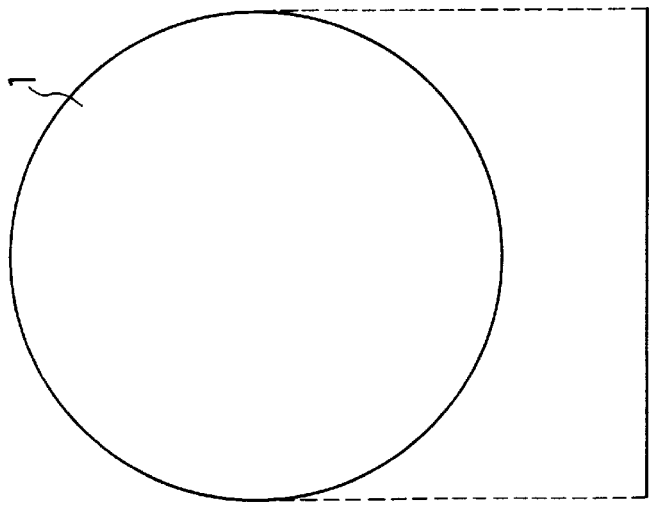
FIGS. 3A–3D are schematic views illustrating a method of folding the air bag according to the first embodiment.
Figure 3B:
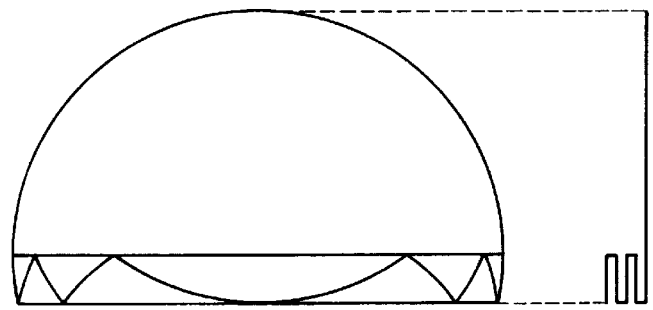
Figure 3C:
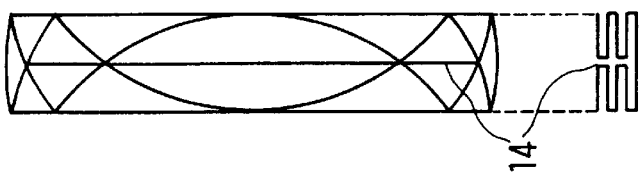

The method of folding the air bag 1 is shown by FIGS. 3A–3D. In this folding method, a left side of the air bag 1, which is sewed to become a balloon-like shape (FIG. 3A), is folded four times in zigzag (FIG. 3B). Next, a right side of the air bag 1 is also folded four times in zigzag (FIG. 3C). Both the folded left side and the folded right side are positioned at a matching portion 14. As a result, a first stage folding of the air bag 1 is completed. The longitudinal direction of the air bag after the first stage folding becomes a direction for the folded air bag 1 to be deployed.

Figure 3D:
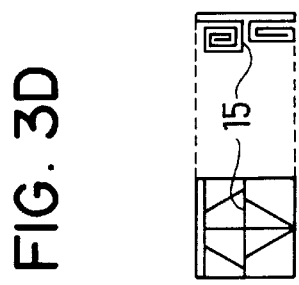

An upper half and lower half of the air bag 1 after the first stage folding are rolled up in the respective directions as shown in FIG. 3D so that the folded air bag can enter a space in a pad 2 for containing it. The rolled upper half and the rolled lower half of the air bag 1 are positioned at a matching portion 15. As a result, the air bag 1 is folded in the rectangular shape, and a second stage folding of the air bag 1 is completed.

Figure 4A:
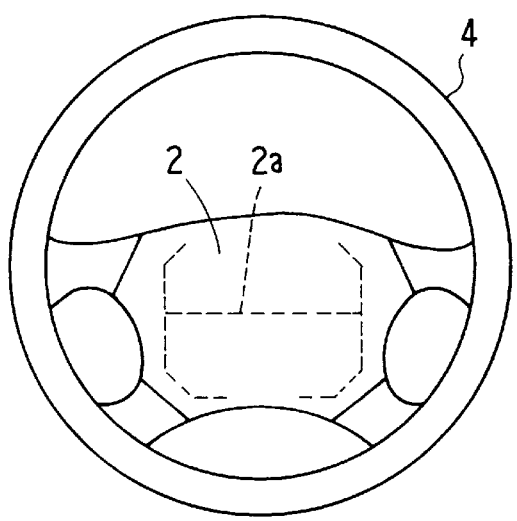
FIG. 4A is a schematic view of a steering wheel and a pad thereof according to the first embodiment.
Figure 4B:
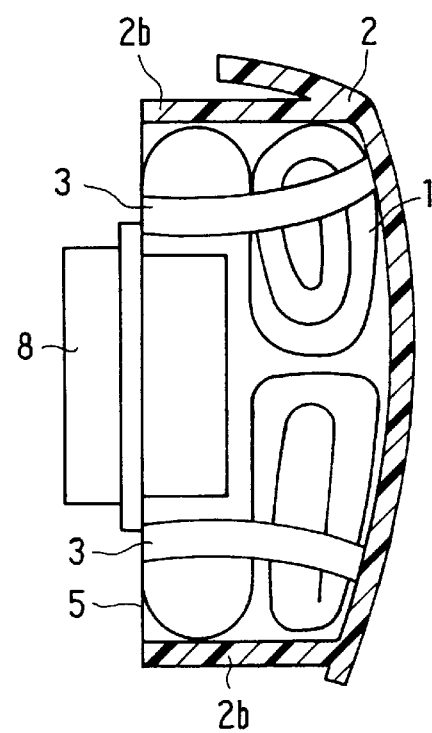
FIG. 4B is a schematic view illustrating a state that the folded air bag is contained in the pad in the first embodiment.

FIG. 4A shows the appearance of a steering wheel 4 including a pad 2. FIG. 4B shows a state that the folded air bag 1 is contained in the pad (covering member) 2 of the steering wheel 4. The steering wheel 4 has four spokes. The tear line 2a is formed in the pad 2 so that the pad 2 is opened in a substantially rectangular shape when the pad 2 is fractured at the tear line 2a. The tear line 2a fractures when pressure applied from the air bag 1 to the pad 2 reaches a predetermined level. The air bag 1 is fixed to a case (fixing member) 5 along with an inflator 8. The case 5 is fixed to a side wall 2b of the pad 2. In this way, the folded air bag 1 is fixed to and contained in the pad 2 of the steering wheel 4.

Next, a deploying state of the air bag 1 is described with reference to FIGS. 2A–2D.

Before the inflator 8 is ignited, a pressure due to a restoring force of the folded air bag 1 is applied to a rear surface of the pad 2 (FIG. 2A). When the inflator 8 is ignited to generate a gas, the gas is supplied into the air bag 1. At this time, a part 1b of the air bag 1 in the vicinity of the inflator 8 expands. By the expansion of the part 1b, the pressure applied from the air bag 1 to the pad 2 increases, whereby the center part of the pad 2 expands outward (FIG. 2B).

When the pressure applied from the air bag 1 to the pad 2 reaches a predetermined pressure, the pad 2 is fractured at the tear line 2a. At this time, because the corner portions 1a of the air bag 1 are temporarily held by the expansion restraining members 3, end portions 1c of the air bag 1 rotate outward (in the respective directions shown by arrows) with tip portions A of the corner portions 1a serving as fulcrums (FIG. 2C). As a result, the air bag 1 is expanded at and deployed from its center portion 1d (FIG. 2D).

After the center portion 1d of the air bag 1 is expanded, the end portions 1c of the air bag 1 start to be expanded. When the end portions 1c expand to some extent, temporary holding of the corner portions 1a due to the expansion restraining members 3 is released. Therefore, the end portions 1c of the air bag 1 are fully expanded and deployed.

In this way, because the corner portions 1a of the air bag 1 are temporarily held by the expansion restraining members 3, it is possible to prevent the end portions 1c of the air bag 1 from rapidly deploying. That is, the air bag 1 deploys in a round shape from its center portion 1d. As a result, when the air bag 1 deploys, it is possible to prevent the air bag 1 from injuring a passenger, thereby protecting the passenger more reliably.

It is to be noted that, although the air bag 1 is folded in the rectangular shape and the corner portions 1a of the air bag 1 are temporarily held by the expansion restraining members 3, the shape into which the air bag 1 is folded is arbitrary.

Figure 5:
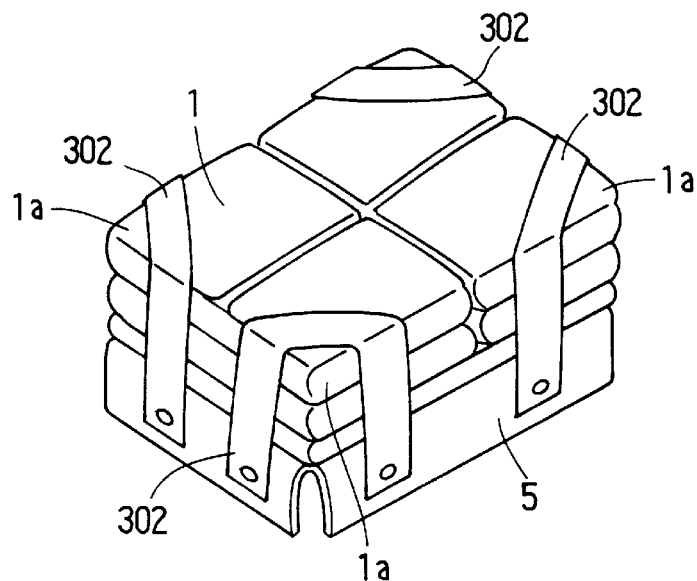
FIG. 5 is a perspective view illustrating a state that both ends of each of expansion restraining members are fixed to a case according to a modification of the first embodiment.

FIG. 5 shows a modification of the first embodiment. In the first embodiment, the expansion restraining member 3 has a ring shape and is fit to each of the corner portions 1a of the air bag 1. However, the expansion restraining member of a strap-like shape 302 may be used as shown in FIG. 5. In this case, the both ends of the expansion restraining member 302 can be fixed to the case 5 while the expansion restraining member 302 is disposed around the corner portion 1a. Further, the both ends of the expansion restraining member 302 can be fixed to the air bag 1 itself and so on.

(Second Embodiment)

In the second embodiment, the expansion restraining member fixed to the air bag and so on will be explained.

Figure 6:
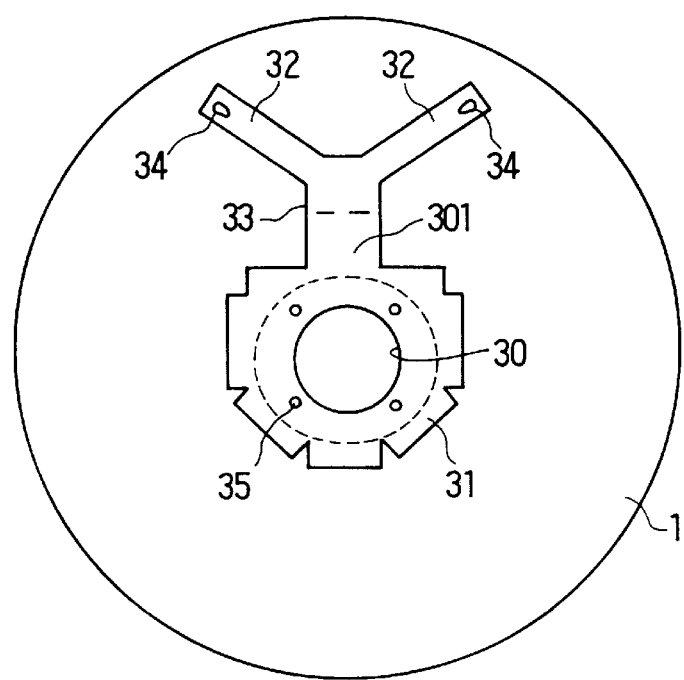
FIG. 6 is a view illustrating an air bag and an expansion restraining member according to a second embodiment of the present invention.
Figure 10:
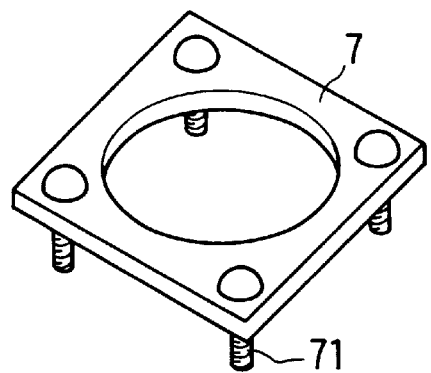
FIG. 10 is a perspective view schematically illustrating a retainer used in the second embodiment.

FIG. 6 shows a state that an expansion restraining member 301 is sewed onto an air bag 1. A hole 30, which has a diameter substantially identical to that of an opening (not shown) of the air bag 1, is formed at one end portion 31 of the expansion restraining member 301. Bolt holes 35 are formed at predetermined locations around the hole 30. Bolt portions 71 of a retainer (retaining member) 7 are inserted into the bolt holes 35. The retainer 7 is shown in FIG. 10 and is used for attaching the air bag 1 onto a case 5. The expansion restraining member 301 is sewed onto the air bag 1 while the hole 30 and the bolt holes 35 are positioned corresponding to the opening and bolt holes (not shown) of the air bag 1.

The expansion restraining member 301 forks at the other end portion, whereby the other end portion of the expansion restraining member 301 comprises two end pieces 32. A small hole 34 is formed in each of the end pieces 32. Further, between one and the other end portions, a slit (tear line) 33 is formed on the expansion restraining member 301 in a width direction thereof.

After the air bag 1 is folded as shown in FIGS. 3A–3D, two corner portions 1a are diagonally folded at bending portions 1e. As a result, the shape of the folded air bag becomes a pentagon. The expansion restraining member 301 is disposed around the folded air bag 1 while passing through a substantially center part of the air bag 1 as shown in FIG. 7A. At this time, the bending portions 1e are held by the end pieces 32, and the small holes 34 are fixed to the bolt portions 71 of the retainer 7 as shown in FIG. 7B. FIGS. 7A and 7b shows the folded air bag 1 and the expansion restraining member 301 disposed therearound, viewed from upper and lower sides thereof. Further, FIG. 8 is a perspective view of the folded air bag 1 and the expansion restraining member 301 disposed therearound.

FIG. 9B shows a state that the air bag 1 is contained in a pad 2 of a steering wheel 41. It is to be noted that FIG. 9A shows an appearance of the steering wheel 41. The steering wheel 41 has three spokes. The tear line 2a of a substantially "T" shape is formed in the pad 2. The tear line 2a fractures when the pressure applied from the air bag 1 to the pad 2 reaches a predetermined pressure. The pad 2 is opened in a substantially pentagonal shape when the tear line 2a fractures. It is to be noted that an upper side portion 1g of the air bag 1 is located outside a region to be opened in the pad 2, whereby the expansion of the upper side portion 1g is restrained by an edge of the pad 2 facing to the opening.

The air bag 1 is fixed to a case 5 along with an inflator 8. The case 5 is fixed to a side wall 2b of the pad 2. In this way, the folded air bag 1 is fixed to and contained in the pad 2 of the steering wheel 41.

When the pressure applied from the air bag 1 to the expansion restraining member 301 and the pad 2 reaches the predetermined pressure, the expansion restraining member 301 and the pad 2 almost concurrently fracture at the slit 33 and the tear line 2a, respectively. Thereby, the air bag 1 starts to be deployed. At this time, in FIGS. 9A and 9B, because an upper side portion 1g of the air bag 1 is located outside the region to be opened in the pad 2, the upper side portion 1g of the air bag 1 is temporarily held by an upper side portion 2b of the pad 2. As a result, the deployment of the upper side portion 1g of the air bag 1 is suppressed.

On the other hand, because a lower side portion 1h of the air bag 1 is not held by a lower-left side portion 2c and a lower-right side portion 2d of the pad 2, the expansion of the lower side portion 1h is not restrained by the pad 2. However, the end pieces 32 of the expansion restraining member 301 are disposed around the bending portions 1e of the air bag 1 so that a tip portion 1f of the folded air bag 1 penetrates a hole formed by the two end pieces 32. Therefore, even after the expansion restraining member 301 is fractured at the tear line 33, the tip portion 1f of the folded air bag 1 is temporarily held by the two end pieces 32. Therefore, the lower side portion 1h of the air bag 1 rotates with the tip portion 1f as a fulcrum. As a result, the lower side portion 1h is deployed later than the center portion of the air bag 1.

In this way, because the deployments of the upper and lower side portions 1g, 1h of the air bag 1 are restrained to the same extent, the air bag 1 deploys in a round shape from its center portion. Therefore, by the second embodiment described above, the same effects as those of the first embodiment can be obtained.

Figure 11:
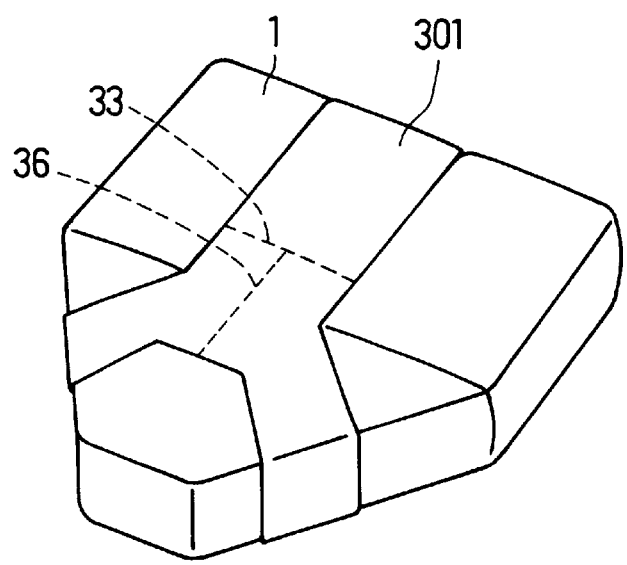
FIG. 11 is a perspective view schematically illustrating an expansion restraining member provided with a tear line in a longitudinal direction thereof according to a first modification of the second embodiment.

Although the slit 33 is formed on the expansion restraining member 301 in a width direction thereof, as shown in FIG. 11, a slit 36 may be formed on the expansion restraining member 301 in a longitudinal direction thereof in addition to the slit 33. When the pressure applied from the lower side portion 1h of the air bag 1 to the two end pieces 32 reaches a predetermined value after the slit 33 is fractured, the two end pieces 32 are reliably cut off at the slit 36.

Also, in the second embodiment, one end portion 31 of the expansion restraining member 301 is fixed to the air bag 1 by sewing, and the other end portion (end pieces 32) thereof is fixed to the retainer 7. However, the both end portions of the expansion restraining member 301 may be connected to the member other than the air bag 1 and the retainer 7, for example to the case 5.

Figure 12A:
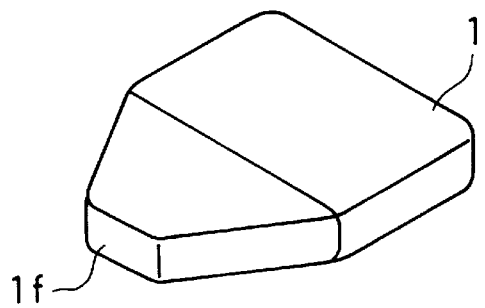
FIGS. 12A–12C are schematic views illustrating an expansion restraining member having an opening for temporarily holding a tip portion of an air bag according to a second modification of the second embodiment.
Figure 12B:
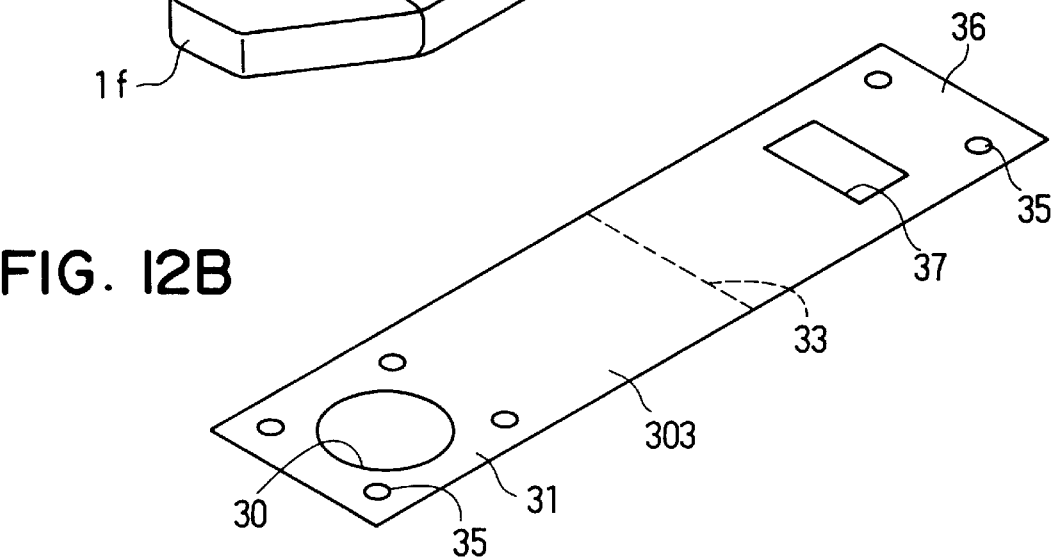
Figure 12C:
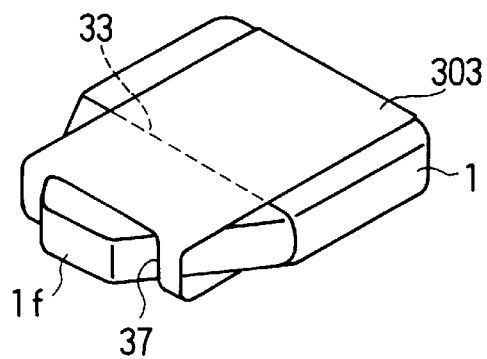

Further, in the second embodiment, the expansion restraining member 301 forks at the other end portion. However, as shown in FIGS. 12A–12C, a hole 37 may be formed in an end portion 36 of an expansion restraining member 303 having a rectangular shape. The tip portion 1*f* of the folded air bag 1 is inserted into the hole 37, thereby temporarily holding the tip portion 1*f* after the slit 33 is fractured by the pressure applied from the air bag 1. It is to be noted that FIG. 12A shows the folded air bag 1, FIG. 12B shows the expansion restraining member 303, and FIG. 12C shows a state that the expansion restraining member 303 is disposed around the folded air bag 1.

According to the expansion restraining member 303 as shown in FIGS. 12B and 12C, after the expansion restraining member 303 fractures at the slit 33 due to the expansion of the air bag 1, the end portion 36 having the hole 37 temporarily holds the tip portion 1*f* of the air bag 1. Therefore, because the expansion of the tip portion 1*f* is restrained, the air bag 1 is deployed from its center portion. The tip portion 1*f* expands following to the deployment of the center portion of the air bag 1. When the tip portion 1 expands to some extent, temporary holding of the tip portion 1*f* due to the end portion 36 is released. In this manner, it is possible to prevent the tip portion 1*f* of the air bag 1 from rapidly being deployed.

Figure 13A:
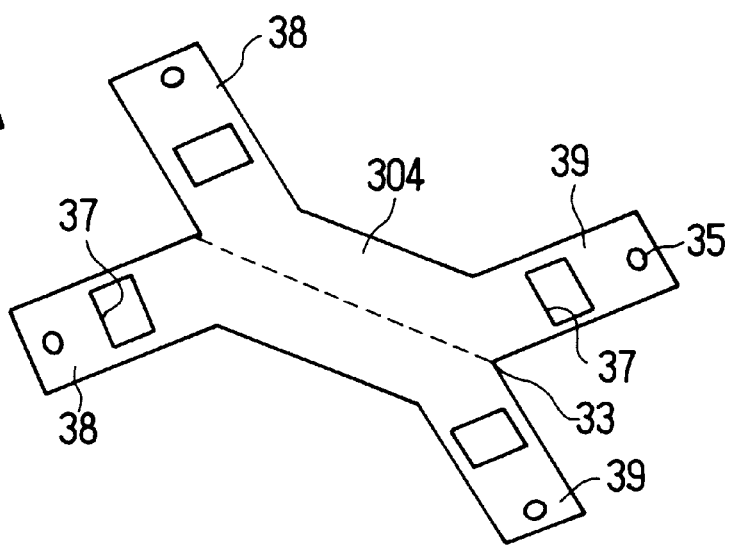
FIGS. 13A–13C are schematic views illustrating an expansion restraining member having openings for temporarily holding corner portions of an air bag according to a third modification of the second embodiment.
Figure 13B:
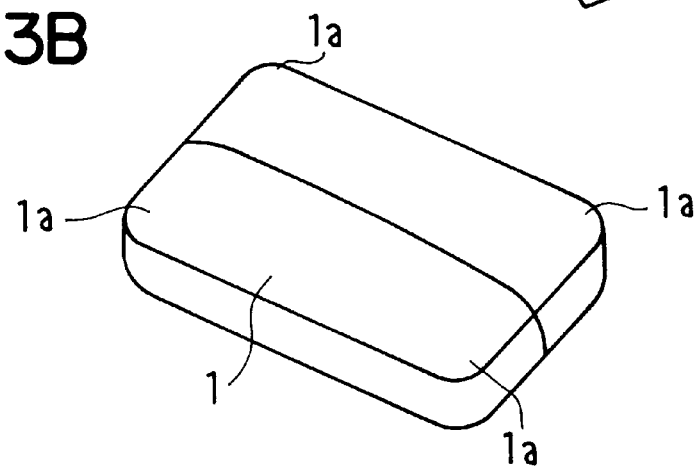
Figure 13C:
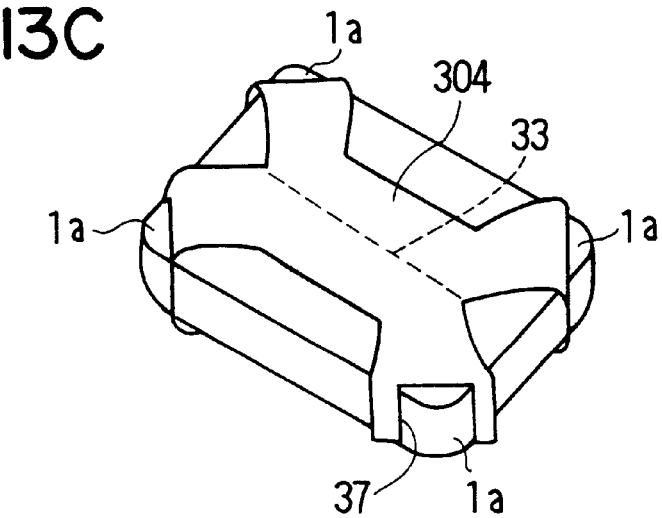

Another modification of the second embodiment is shown in FIGS. 13A–13C. FIG. 13A shows an expansion restraining member 304, FIG. 13B shows a folded air bag 1 and FIG. 13C shows a state that the expansion restraining member 304 is disposed around the folded air bag 1.

As shown in FIGS. 13A and 13B, when the air bag 1 is folded into a rectangular shape, the expansion restraining member 304 may folk at both end portions thereof. That is, one end portion comprises two end pieces 38 and the other end portion also comprises two end pieces 39. A hole 37 is formed in each of the end pieces 38, 39, corresponding to the corner portions 1*a* of the folded air bag 1. Further, a bolt hole 35 is also formed in each of the end pieces 38, 39, corresponding to the bolt portions 71 of the retainer 7. Each of the end pieces 38, 39 is fixed to the retainer 7 by inserting the bolt portions 71 of the retainer 7 into the bolt holes 35. When the air bag 1 is deployed, the corner portions 1*a* of the air bag 1 are temporarily held by the end pieces 38, 39. Therefore, because the expansions of the corner portions 1*a* are restrained, the air bag 1 is deployed from its center portion.

It is to be noted that, in the second embodiment and modifications thereof, because the expansion restraining member is disposed around the folded air bag, the shape of the folded air bag is reliably maintained by the expansion restraining member. Therefore, the handling of the folded air bag such as transportation, attachment into the pad and the like can be made easy.

(Third Embodiment)

In the second embodiment, the both ends of the expansion restraining member are fixed to the air bag, the retainer, or the case. In the third embodiment, only one end of an expansion restraining member is fixed to, for example, a retainer, and the other end thereof, in the vicinity of which a hole for temporarily holding a tip portion or a corner portion of an air bag is formed, is not fixed to any parts.

Figure 14A:
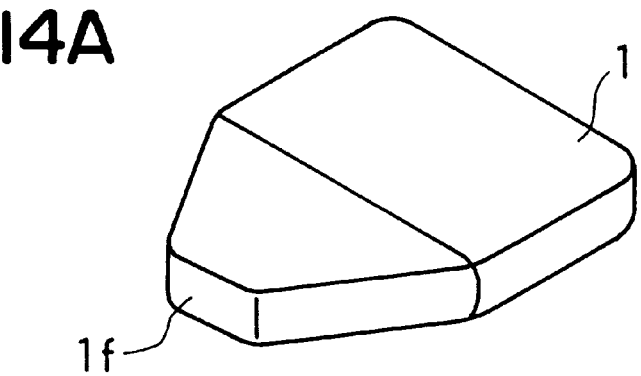
FIGS. 14A–14C are schematic views illustrating an expansion restraining member according to a third embodiment of the present invention.
Figure 14B:
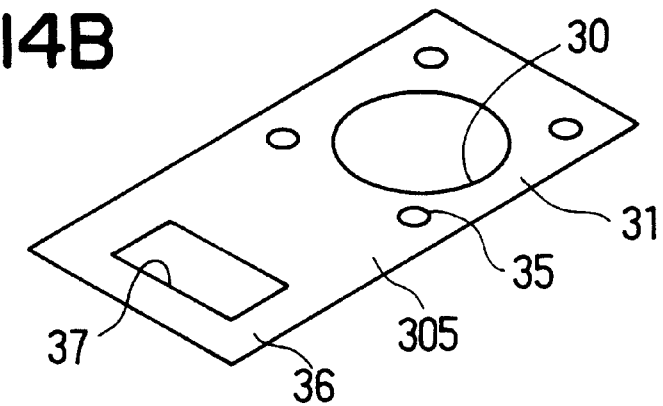
Figure 14C:
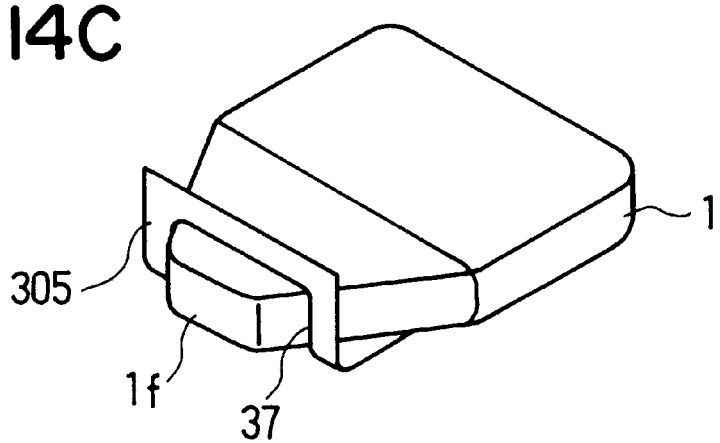

The air bag system according to the third embodiment is shown in FIGS. 14A–14C. FIG. 14A shows an air bag folded into a pentagonal shape, FIG. 14B shows an expansion restraining member 305, and FIG. 14C shows a state that the expansion restraining member 305 is put around the folded air bag 1.

As shown in FIG. 14B, the expansion restraining member 305 has a rectangular shape. At one end portion 31, an opening 30 for allowing gas produced by an inflator or a gas discharging portion of the inflator to be introduced into the air bag 1 and bolt holes 35 into which bolt portions of a retainer are inserted are formed. At the other end portion 36, a hole 37 for temporarily holding a tip portion 1*f* of the air bag 1 is formed.

The end portion 31 of the expansion restraining member 305 is fixed to the retainer. However, although the tip portion 1*f* is inserted into the hole 37, the other end portion 36 is not fixed to any parts. In this case also, when the air bag 1 is deployed, the expansion of the tip portion 1*f* is restrained by the expansion restraining member 305 having the hole 37. As a result, the air bag 1 is deployed in a round shape from its center portion.

Figure 15A:
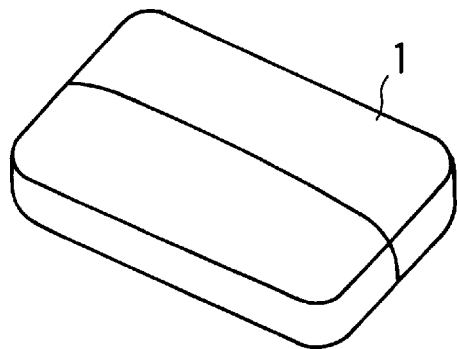
FIGS. 15A–15C are schematic views illustrating an expansion restraining member having openings for temporarily holding corner portions of an air bag according to a modification of the third embodiment.
Figure 15B:
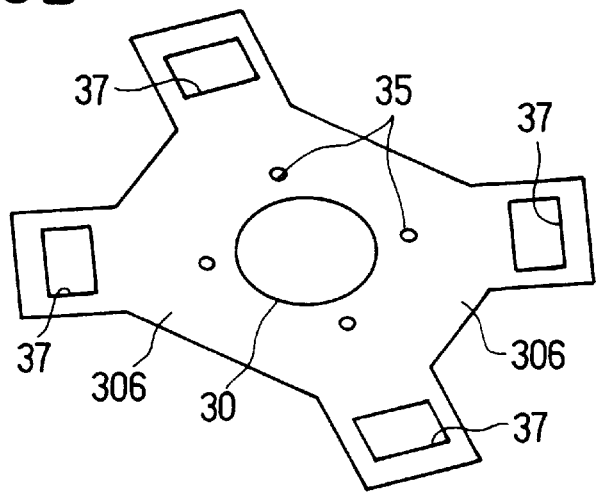
Figure 15C:
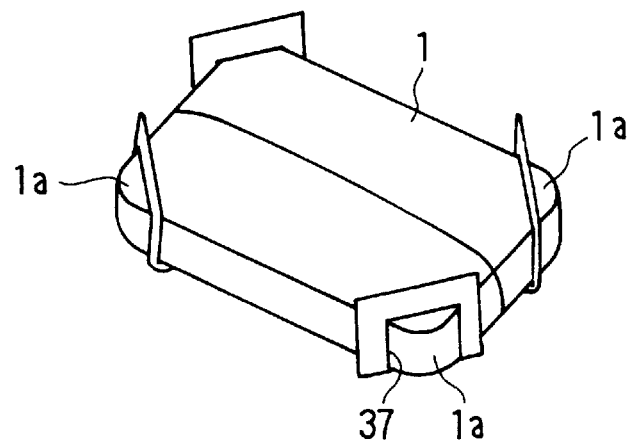

A modification of the third embodiment is shown in FIGS. 15A–15C. In this modification, the air bag is folded in a rectangular shape. In this case, as shown in FIG. 15B, the opening 30 and bolt holes 35 are formed at a substantially center portion of an expansion restraining member 306. The expansion restraining member 306 folks at both end portions thereof. A hole 37 is formed in each of end pieces forming the end portions. The expansion restraining member 306 is fixed to the retainer at its center portion by inserting the bolt portions of the retainer into the holes 35. Because the corner portions 1*a* of the air bag 1 are fit into the holes 37 of the end pieces, the end pieces of the expansion restraining member 306 temporarily hold the corner portions 1*a* of the air bag 1 when the air bag 1 is deployed. Therefore, the expansions of the corner portions 1*a* are restrained, and the air bag is deployed from its center portion. The corner portions 1*a* expand following to the deployment of the center portion of the air bag 1. Therefore, the rapid deployment of the air bag 1 is suppressed, thereby protecting a passenger more reliably.

(Fourth Embodiment)

In the fourth embodiment, one end of each of two expansion restraining members 307 is connected to a peripheral portion of an air bag 1, and the other end thereof is fixed to a fixing member such as a case.

Figure 16A:
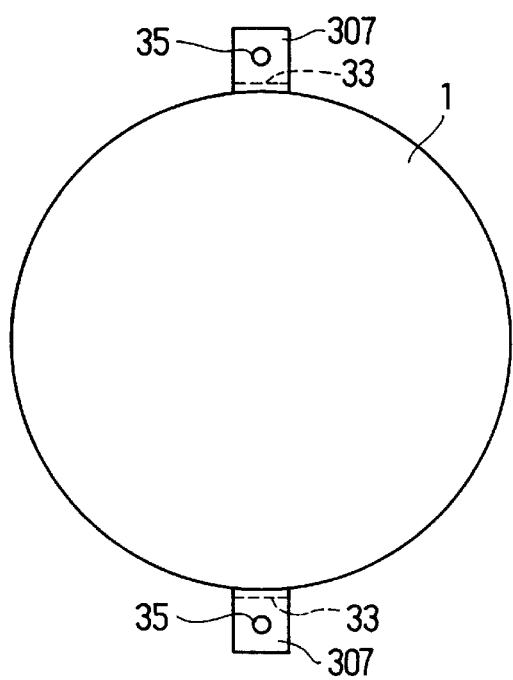
FIGS. 16A–16C are schematic views illustrating an expansion restraining member according to a fourth embodiment of the present invention.
Figure 16B:
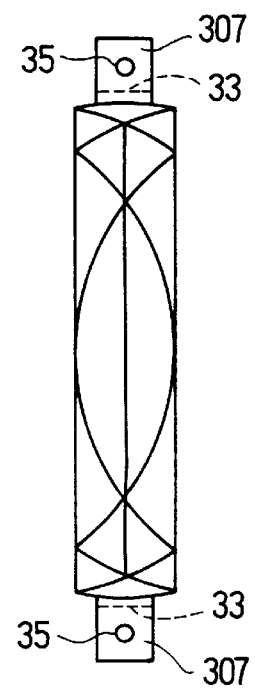
Figure 16C:
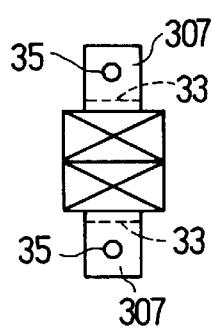

FIGS. 16A–16C show the expansion restraining member 307 according to the fourth embodiment. One end of each of two expansion restraining members 307 is fixed to a peripheral portion of the air bag 1 by sewing. A slit 33 and a hole 35 are provided on each of the expansion restraining members 307.

Figure 17:
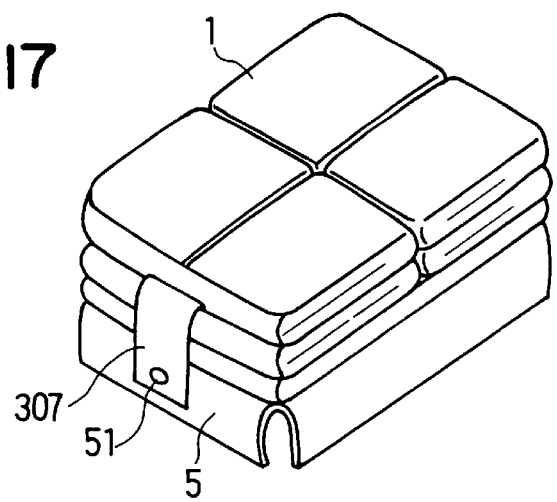
FIG. 17 is a perspective view illustrating a state that an air bag is temporarily held by the expansion restraining member according to the fourth embodiment.

A left side half of the air bag 1 located on a left side from a straight line connecting the two expansion restraining members 307, is folded plural times in zigzag (FIG. 16B). Also, a right side half of the air bag 1 located on a right side from the straight line connecting the two expansion restraining members 307, is folded plural times in zigzag (FIG. 16B). Next, an upper half and lower half of the air bag 1 are folded so that the two expansion restraining members 307 are located outside the folded air bag 1 (FIG. 16C). The air bag 1 folded as shown in FIG. 16C is fixed to a case 5 by using a retainer, and the holes 35 of the expansion restraining members 307 are engaged to projections 51 formed on the case 5, as shown in FIG. 17.

When the air bag 1 starts to deploy, the peripheral portion of the air bag 1 is temporarily held by the expansion restraining members 307 until a force applied from the air bag 1 to the expansion restraining members 307 reaches a predetermined value which can fracture the expansion restraining members 307 at the slits 33. Therefore, the air bag 1 can deploy in a round shape from its center portion. The peripheral portion of the air bag 1 is deployed later than the deployment of the center portion of the air bag 1. Consequently, a rapid deployment of the air bag 1 is suppressed, thereby enhancing safety of the air bag 1. It is to be noted that, although the air bag 1 is folded in the rectangular shape in the fourth embodiment, the expansion restraining member 307 of the fourth embodiment is effective for the air bag folded in the other shape.

(Fifth Embodiment)

The fifth embodiment is characterized by that an expansion restraining member 308 has a cap-like form.

Figure 18:
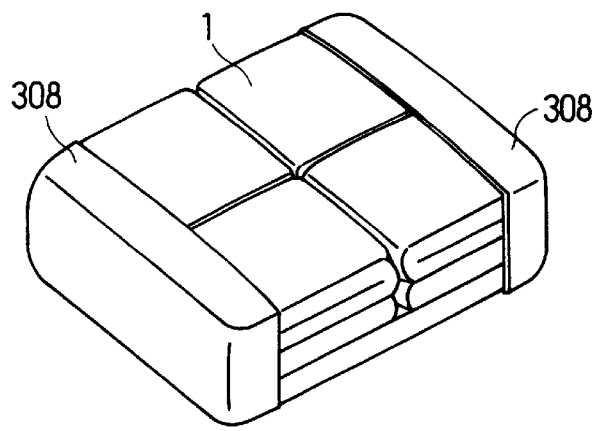
FIG. 18 is a perspective view illustrating a state that an air bag is temporarily held by an expansion restraining member according to a fifth embodiment.

FIG. 18 shows the expansion restraining member 308 according to the fifth embodiment. The expansion restraining member 308 has a cap-like shape. Two expansion restraining members cover two sides of the folded air bag 1 which are opposite to each other, respectively. Therefore, the expansion restraining members 308 can restrain the expansions of the side portions of the air bag 1.

It is to be noted that the sides of the folded air bag 1 covered by the expansion restraining member 308 are preferably the sides perpendicular to a direction along which the upper half and lower half of the air bag 1 after the first stage folding are deployed. Further, the expansion restraining members 308 are for restraining the expansions of the side portions of the air bag 1. Therefore, the expansion restraining member may be formed into "U" shape so that opposing faces of the expansion restraining member sandwich the side portion of the air bag 1 to restrain the expansion of the side portion.

According to the fifth embodiment, when the air bag 1 is deployed, the expansion restraining members 308 of the cap-like shape delay the expansions of the side portions of the air bag 1. Therefore, the air bag is deployed in a round shape from its center portion. When the air bag 1 expands to some extent, the fitting of the expansion restraining members 308 is released, and the side portions of the air bag 1 are deployed following to the deployment of the center portion of the air bag 1. In this way, the rapid deployment of the air bag 1 can be suppressed by using the expansion restraining members 308 of the cap-like shape.

It is to be noted that, although the air bag 1 is folded in the rectangular shape, the air bag 1 may be folded in the different shape, for example a pentagonal shape. When the air bag 1 is folded in the pentagonal shape, an expansion restraining member of a shape which can cover the tip portion 1f of the air bag 1 may be used.

(Sixth Embodiment)

The sixth embodiment is characterized by that a part of a pad 2 around an opening formed when the pad 2 is fractured at a tear line 2a is utilized as an expansion restraining member.

Figure 19:
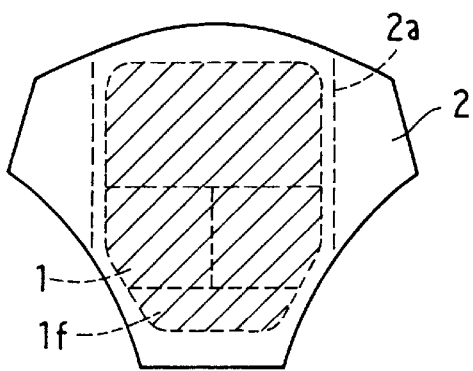
FIG. 19 is a schematic view illustrating an expansion restraining member according to a sixth embodiment of the present invention.

FIG. 19 shows a pad 2 and a folded air bag 1 according to the sixth embodiment. A tear line 2a is formed in a predetermined shape in the pad 2. When the pad 2 is fractured at the tear line 2a, the pad 2 opens in a substantially pentagonal shape. A slant-line region in FIG. 19 shows a folded air bag 1 contained in the pad 2. As shown in FIG. 19, the tip portion 1f of the folded air bag 1 is located outside a region to be opened in the pad 2 by the tear line 2a. That is, even after the pad 2 is fractured at the tear line 2a and the opening of the pentagonal shape is formed therein, the tip portion 1f of the air bag 1 underlies the pad 2 around the opening. Therefore, the tip portion 1f of the air bag 1 is temporarily held by the pad 2 around the opening when the air bag 1 is deployed, thereby restraining the expansion of the tip portion 1f. As a result, the air bag 1 is deployed in a round shape from its center portion. Then, the tip portion 1f is deployed following to the center portion of the air bag 1. Therefore, the rapid deployment of the air bag 1 can be suppressed.

It is to be noted that, although the tip portion 1f is located outside the region to be opened in the pad 2 by the tear line 2a, the sixth embodiment can be applied to an air bag folded in a different shape. That is, the corner portions or side portions of the air bag 1 that delayed deployment is required may be located outside the region to be opened by the tear line 2a.

(Seventh Embodiment)

The seventh embodiment is characterized by that edge portions 1c of an air bag 1 are held between a side wall 2a of a pad 2 and a case 5.

Figure 20:
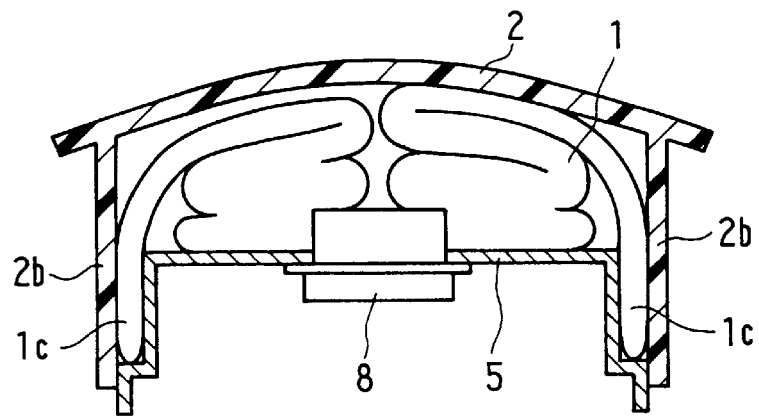
FIG. 20 is a schematic sectional view illustrating an expansion restraining member according to a seventh embodiment of the present invention.
Figure 21:
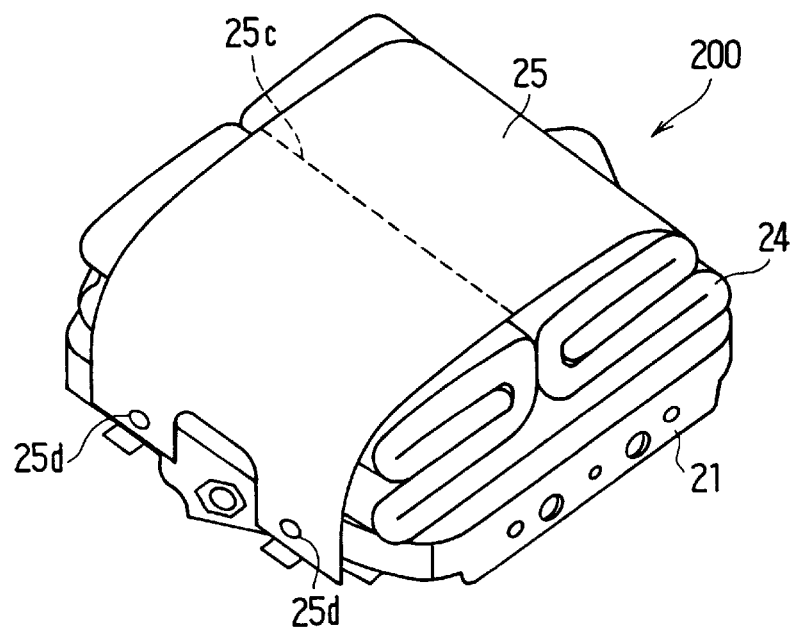
FIG. 21 is a perspective view illustrating a state that a folded air bag is covered by a conventional lapping sheet member.
Figure 22D:
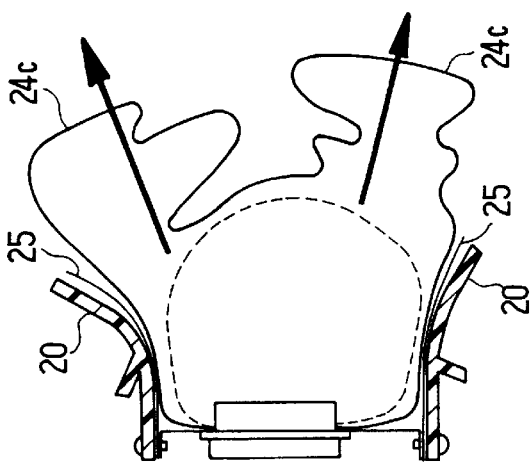
FIGS. 22A–22D are schematic views illustrating a developing state of the conventional air bag.
Figure 22C:
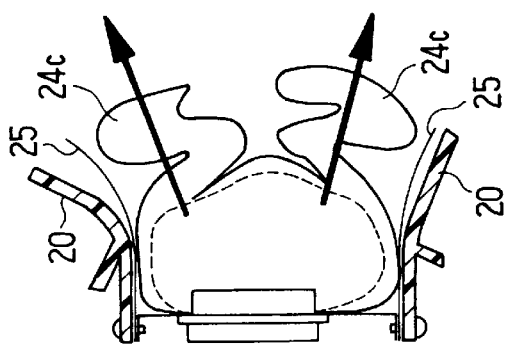
Figure 22B:
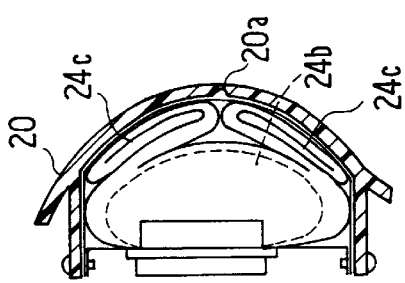
Figure 22A:
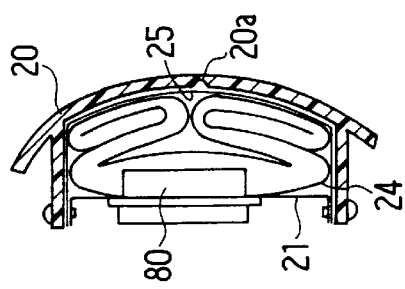

FIG. 20 is a sectional view illustrating a structure of an air bag system according to the seventh embodiment. An air bag 1 and an inflator 8 are fixed to a case 5. The case 5 is fixed to the side wall 2a of the pad 2. The edge portions 1c of the air bag 1 are held between the side wall 2b and the case 5. Therefore, when the air bag 1 is deployed, the expansions of the edge portions 1c are restrained. As a result, the air bag 1 is deployed in a round shape from its center portion. The edge portions 1c of the air bag 1 deploy following to the deployment of the center portion.

What is claimed is:

1. An air bag system comprising:
   an air bag having a center portion, a peripheral portion and an opening through which gas is supplied;
   a container for containing the air bag folded in a predetermined polygonal shape to position the opening at a bottom side of the air bag, the center portion being positioned in a central region of the polygonal shape and a part of the peripheral portion of the air bag being positioned at a corner of the polygonal shape;
   an expansion restraining member disposed around the folded air bag, the expansion restraining member comprising
   a main portion passing through the center of the polygonal shape,
   forked portions formed at the corner of the polygonal shape so that the part of the peripheral portion may be inserted between and be held by the forked portions, and
   a first slit portion formed on the main portion dividing the main portion into two,
   wherein when the folded air bag is deployed, an expansion of the peripheral portion at the corner is delayed compared to an expansion of the center portion due to the expansion restraining member being fractured at the first slit portion to make the center portion free but temporarily holding the peripheral portion.

2. An air bag system according to claim 1, wherein the polygonal shape is a pentagon shape, the expansion restraining member extends from one side of the pentagon shape through the center thereof to two diagonal sides thereof so as to constitute the forked portions, and the slit portion is formed in a width direction of the expansion restraining member.

3. An air bag system according to claim 2, wherein the expansion restraining member is provided at the main portion thereof with a second slit portion in a longitudinal direction thereof so that the expansion restraining member may be also fractured at the second slit portion so as to divide the forked portions into two when the folded air bag is deployed.

4. An air bag system according to claim 3, wherein the expansion restraining member is fractured at the second slit portion with delay after the expansion restraining member is fractured at the first slit portion.

5. An air bag system according to claim 3, wherein the expansion restraining member is provided at a leading end thereof with a hole nearly identical to the opening and is stitched around the hole onto the air bag, and the hole is positioned to correspond to the opening.

6. An air bag system according to claim 2, wherein the container has a covering member provided with a predetermined shaped tear line that fractures to form a substantially pentagonal opening in the cover member almost at the same time when the first slit portion fractures when the folded air bag is deployed, and the one side of the folded air bag is positioned outside an upper periphery of the pentagonal opening so that an expansion of the one side of the folded air bag may be delayed compared to an expansion of the center portion.

7. An air bag system according to claim 1, wherein the polygonal shape is a four sided shape, at four corners of which parts of the peripheral portion are respectively positioned, and the forked portions are provided at each of the four corners of the four sided shape.

8. An air bag system according to claim 1, wherein the expansion restraining member is provided with a hole through the forked portions so that the part of the peripheral portion held by the forked portions may be inserted into the hole.

* * * * *